(12) United States Patent
Grava et al.

(10) Patent No.: US 12,290,958 B2
(45) Date of Patent: May 6, 2025

(54) DE-MOLDING SYSTEM OF CERAMIC PARTS MANUFACTURED BY FREEZE-CASTING, AND MOLD COOLING SYSTEM AND METHOD FOR MANUFACTURING CERAMIC PARTS BY FREEZING-CASTING

(71) Applicants: PETROLEO BRASILEIRO S.A.—PETROBRAS, Rio de Janeiro (BR); STATOIL BRASIL OLEO E GAS LTDA., Rio de Janeiro (BR); Universidade Federal de Minas Gerais—UFMG, Belo Horizonte (BR)

(72) Inventors: Wilson Mantovani Grava, Rio de Janeiro (BR); Wander Luiz Vasconcelos, Nova Lima (BR); Peter Wilhelmus Jacques Derks, Rio de Janeiro (BR); Jailton Ferreira do Nascimento, Rio de Janeiro (BR); Eduardo Henrique Martins Nunes, Belo Horizonte (BR); Douglas Fernandes de Souza, Ipatinga (BR); Daniela Cordeiro Leite Vasconcelos, Nova Lima (BR)

(73) Assignees: PETROLEO BRASILEIRO S.A.—PETROBRAS, Rio de Janeiro (BR); STATOIL BRASIL OLEO E GAS LTDA., Gloria (BR); Universidade Federal de Minas Gerais—UFMG, Belo Horizonte (BR)

( * ) Notice: Subject to any disclaimer, the term of this patent is extended or adjusted under 35 U.S.C. 154(b) by 306 days.

(21) Appl. No.: 17/667,929

(22) Filed: Feb. 9, 2022

(65) Prior Publication Data

US 2022/0168922 A1  Jun. 2, 2022

Related U.S. Application Data

(62) Division of application No. 16/397,069, filed on Apr. 29, 2019, now Pat. No. 11,458,649.

(30) Foreign Application Priority Data

May 23, 2018  (BR) .................. 10 2018 010463-2

(51) Int. Cl.
  *B28B 17/00*   (2006.01)
  *B28B 1/00*    (2006.01)

(52) U.S. Cl.
  CPC .......... *B28B 17/0081* (2013.01); *B28B 1/007* (2013.01)

(58) Field of Classification Search
  None
  See application file for complete search history.

(56) References Cited

U.S. PATENT DOCUMENTS 3,308,919 A * 3/1967 Cunningham ........... B41J 29/08
                                                    400/690
6,264,111 B1 * 7/2001 Nicolson ............ G05D 23/1904
                                                    236/51

(Continued)

FOREIGN PATENT DOCUMENTS

EP       1 019 208 B1    8/2002
GB       2430999 A  *    4/2007  ........... F28D 1/0213

(Continued)

OTHER PUBLICATIONS

Machine English translation of JP H05-38721A, Accessed Oct. 20, 2021 (Year: 1993).

(Continued)

*Primary Examiner* — Jacob T Minskey
*Assistant Examiner* — Adrianna N Konves
(74) *Attorney, Agent, or Firm* — Sughrue Mion, PLLC (57) ABSTRACT

Provided is a mold cooling system for the manufacturing of ceramic parts by freeze-casting including: a source (1) of cooling gas; a cooling gas cooling medium (7) fluidically connected to the cooling gas source (1); and a cooling cell (5), fluidly connected to the cooling gas cooling medium (7), including a mold (9) in its interior, wherein the cooling cell (5) includes a refrigerated cooling gas injection opening.

(Continued)

Thus, a mold cooling system is provided for the manufacturing of ceramic parts by freeze-casting including the stages of: refrigerating a cooling gas coming from a cooling gas source (1); and injecting a cooling gas that is refrigerated in a cooling cell (5) including a mold (9) in its interior.

11 Claims, 7 Drawing Sheets

(56) References Cited

U.S. PATENT DOCUMENTS

| | | | |
|---|---|---|---|
| 2003/0108638 A1* | 6/2003 | Neter | B29C 45/7207 |
| | | | 425/547 |
| 2005/0156361 A1 | 7/2005 | Holowczak et al. | |
| 2008/0136068 A1* | 6/2008 | Leone | B29C 35/16 |
| | | | 425/526 |
| 2009/0229598 A1* | 9/2009 | Cao | F24S 80/30 |
| | | | 428/34.4 |
| 2013/0224328 A1 | 8/2013 | Fang et al. | |

FOREIGN PATENT DOCUMENTS

| | | |
|---|---|---|
| JP | 5-38721 | 2/1993 |
| KR | 10-2009-0044628 A | 5/2009 |

OTHER PUBLICATIONS

Machine English translation of EP 1 019 208 B1, Accessed Oct. 20, 2021 (Year: 2002).

* cited by examiner

DE-MOLDING SYSTEM OF CERAMIC PARTS MANUFACTURED BY FREEZE-CASTING, AND MOLD COOLING SYSTEM AND METHOD FOR MANUFACTURING CERAMIC PARTS BY FREEZING-CASTING

CROSS-REFERENCE TO THE RELATED APPLICATIONS

This application is a division of U.S. application Ser. No. 16/397,069, filed Apr. 29, 2019, which claims priority from Brazil Patent Application No. 10 2018 010463-2, filed on May 23, 2018, in the Brazilian Patent Office, the disclosures of which are incorporated herein by reference in their entireties.

FIELD

This invention is related to techniques for manufacturing ceramic parts. More specifically, this invention is related to techniques for manufacturing ceramic parts by the freeze-casting process.

BACKGROUND

Two of the major difficulties associated with the manufacturing of ceramic parts (porous materials) via the conventional freeze-casting process concern the control of the cooling rate of the ceramic suspension and the de-molding of the material obtained.

In the current state of the art, the methodologies adopted in the cooling stage on the freeze-casting process are very limited. Typically, the cooling base is partially immersed in previously-cooled liquids (such as ethanol and water), or even in liquid nitrogen. Another methodology adopted includes the variation of the metallic rod temperature partially immersed in liquid nitrogen, which does not allow the manufacturing of materials with radial porosity.

Likewise, the method of extracting the samples solidified in the mold is a rather rudimentary procedure, where human effort is required. It is a neglected procedure in the state of the art.

Thus, the absence of ceramic-forming techniques via the freeze-casting process that have a precise control of the cooling temperature gradient, which is directly proportional to a higher quality and control of pore formation, can be observed in the state of the art. In addition, there is no efficient device and method of extracting the samples solidified in the mold in the state of the art.

Thus, it becomes very difficult that a precise control of the porosity of the materials is obtained by the known freeze-casting technology of the state of the art which does not allow the precise control of the cooling temperature gradient of a ceramic part manufacturing [sic] and neither does it facilitate the extraction of the part from the mold.

Some state of the art documents are available on the technology in question. However, none of these documents offers solutions to the above limitations, as can be seen in the following paragraphs.

The document "*Freeze-Casting of Porous Biomaterials: Structure, Properties and Opportunities*," by Sylvain Deville, presents a review on the freeze-casting technique for the manufacturing of ceramic samples and the possibility of applying the technique to biomaterials.

However, nothing is mentioned with regard to gas-controlled cooling methods or methods of extraction of the samples from the molds.

The document "Preparation of Tubular Hierarchically Porous Silicate Cement Compacts via a Tert-Butyl Alcohol (TBA)-Based Freeze Casting Methodapresenta [sic: Method]," by Dong, Senjie et al., discloses a study on the freeze-casting technique using TBA (tert-butyl alcohol), wherein the samples had completely open porosity and unidirectional alignment.

However, nothing is mentioned in this document with regard to gas-controlled cooling methods or methods of extraction of the samples from the molds.

Document KR2009044628A discloses a method of manufacturing a ceramic part by freeze-casting comprising the stages of pouring the ceramic material into a mold and applying low temperature for its subsequent extraction.

However, nothing is mentioned with regard to gas-controlled cooling methods or methods of extraction of the samples from the molds.

Document US20050156361A1 discloses a method of manufacturing ceramic parts (molds) by freeze-casting.

However, nothing is mentioned with regard to gas-controlled cooling methods or methods of extraction of the samples from the molds.

As will be better described below, this invention seeks to resolve the above-described problems of the state of the art in a practical and efficient manner.

SUMMARY

The purpose of this invention is to provide a system and method for the manufacturing of ceramic parts by freeze-casting which comprises the control of the cooling of a mold with pre-cooled gas as well as a system for the extraction of samples from the mold.

In order to achieve the above-described purposes, this invention provides a de-molding system of ceramic parts manufactured by freeze-casting comprising a mold, wherein the mold comprises an upper opening and a lower opening, wherein the upper opening is adapted to receive a colloidal suspension, and one of the openings is adapted to allow the passage of a manufactured ceramic part, wherein the system comprises at least one main de-molding element adapted to actuate a ceramic part manufactured through an opening in the mold.

In addition, the invention provides a mold cooling system for the manufacturing of ceramic parts by freeze-casting comprising: a source of cooling gas; a cooling gas cooling medium fluidically connected to the cooling gas source; and a cooling cell, fluidly connected to the cooling gas cooling medium, comprising a mold in its interior, wherein the cooling cell comprises a refrigerated cooling gas injection opening.

Thus, a mold cooling method for manufacturing ceramic parts by freeze-casting is also provided which comprises the stages of: refrigerating a cooling gas from a cooling gas source; and injecting a refrigerated cooling gas into a cooling cell comprising a mold in its interior.

BRIEF DESCRIPTION OF THE FIGURES

The detailed description below makes reference to the accompanying figures and their respective reference numbers.

FIG. 2b illustrates the cross-section AA indicated in FIG. 2a.

FIG. 6b illustrates the section EE in FIG. 6a.

DETAILED DESCRIPTION

It should be emphasized first and foremost that the description below will be based on a preferred embodiment of the invention. However, the invention is not limited to this particular embodiment, as will be apparent to any technician trained in the matter.

Figure 1:
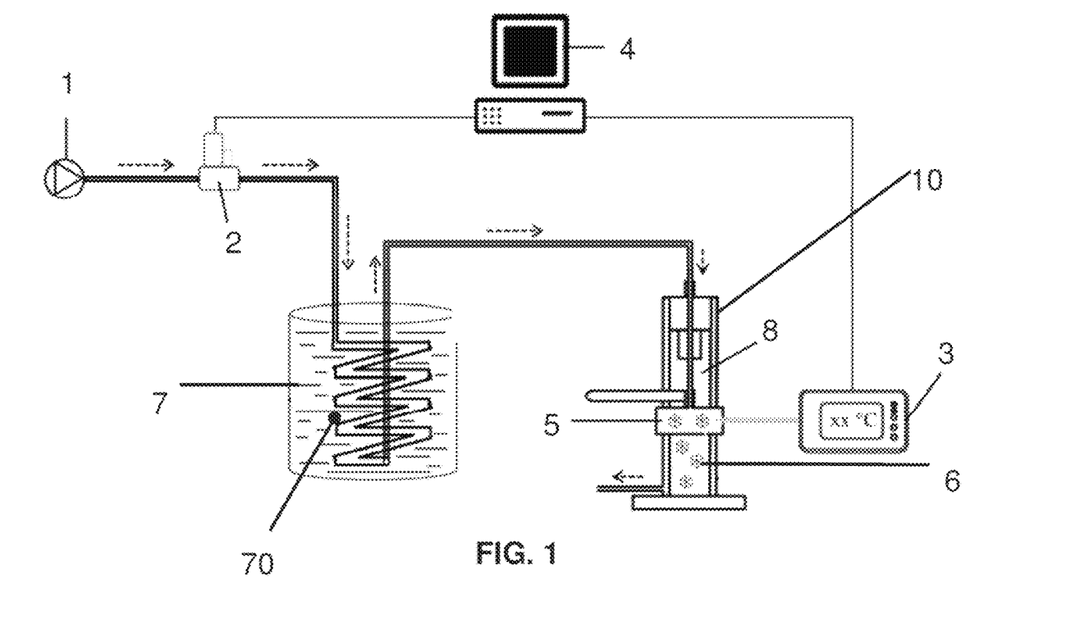
FIG. 1 illustrates a schematic view of the mold cooling system for the manufacturing of ceramic parts manufactured by freeze-casting of this invention.

FIG. 1 illustrates a schematic view of the mold cooling system for manufacturing ceramic parts manufactured by freeze-casting of this invention.

More generally, the mold cooling system for manufacturing ceramic parts manufactured by freeze-casting comprises: a cooling gas source 1; a cooling gas cooling medium 7 fluidly connected to the cooling gas source 1; and a cooling cell 5 which comprises a mold 9 in its interior.

The cooling cell 5 is also fluidly connected to the cooling gas cooling medium 7 and comprises a refrigerated cooling gas injection opening. Thus, a refrigerated gas is injected into the cooling cell 5 through the gas injection opening, and the cooling gas is responsible for refrigerating the mold 9 inside this cell.

Thus, equally in a general manner, a mold cooling method is provided for the manufacturing of ceramic parts by freeze-casting which comprises the stages of: refrigerating a cooling gas from a cooling gas source 1; and injecting a refrigerated cooling gas into a cooling cell 5 comprising a mold 9 in its interior.

Optionally, the refrigerant gas cooling medium 7 comprises a heat exchanger immersed in a cooling fluid, wherein the heat exchanger is a coil 70.

Optionally, the system may comprise: a mass flow controller 2 adapted to control the volume of cooling gas injected into the cooling cell 5; at least one temperature sensing device, wherein at least one temperature sensing device is a proportional integral derivative (PID) controller 3; and a data processing unit 4.

In this configuration, the data processing unit 4 is in communication with the mass flow controller 2, at least one temperature sensing device, and the proportional integral derivative controller 3. Thus, the data processing unit 4 can receive information concerning the temperatures of the cooling gas at any point in the system, from the cooling cell 5, and from other components of the system wherein we wish to control the temperature.

Preferably, gas lines in stainless steel are suggested for fluid communication between all the elements described in order to avoid corrosion in those components. However, possible modifications are foreseen as to the material used, depending on the specific situation wherein the device will be used.

Optionally, the refrigerant gas is a gas with a low moisture content (for example, below 20%), the flow rate of that gas being adjusted by the mass flow controller 2. After adjusting the flow rate, the gas is directed to the cooling gas cooling medium 7, which may comprise a coil 70 in a material with high thermal conductivity (such as aluminum, copper and stainless steel, among others) immersed in a cooling fluid.

Optionally, liquid nitrogen can be used as a cooling fluid in this system. However, the liquefaction and solidification temperatures of the gaseous species used must be taken into account in order to avoid clogging the gas line.

Thus, during the passage of the cooling gas through the heat exchanger coil 70 the gas exchanges heat with the medium and leaves the cooling medium at a temperature lower than it was. The rate of heat loss of the gas is a function of its residence time in the coil 70 which is, in turn, related to the flow rate of the gaseous species. Thus, the lower the gas flow, the longer its residence time in the coil 70 and the greater the associated heat loss.

It should be noted that these factors should be considered and adapted to the case at hand. Therefore, the method of this invention also provides for a stage of control of the residence time of the cooling gas in the cooling gas cooling medium 7.

After being cooled, the cooling gas is directed to the cooling cell 5, which is coupled to a mechanical-hydraulic component. This mechanical-hydraulic component basically consists of a hydraulic press used in the de-molding stage of the samples obtained, as will be better described later on in this report. The colloidal suspension 92 containing the materials of interest is pre-cast into the mold 9 inside the cooling cell 5.

Optionally, the invention also provides for a device 8 to be coupled to this mold cooling system, for assisting the de-molding of the manufactured ceramic part. This device 8 will be further detailed later on in this report.

Figure 2:
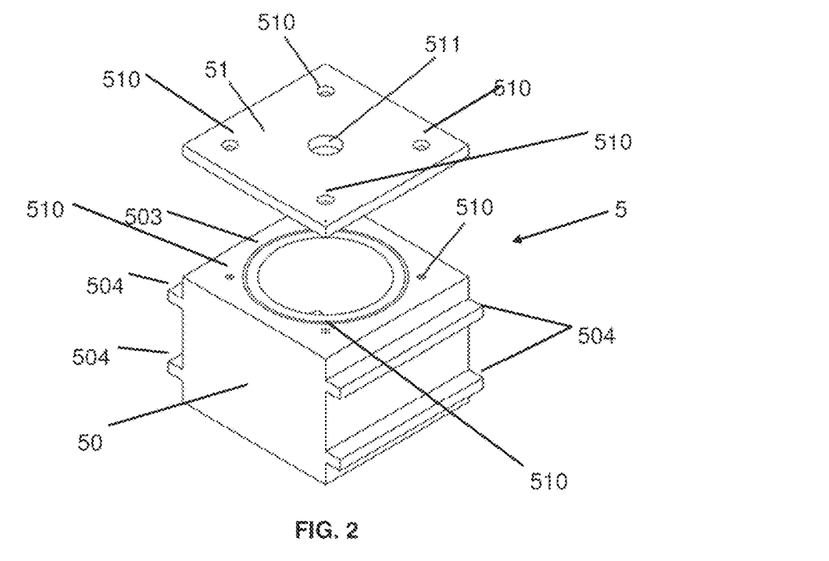
FIG. 2 illustrates a view of an optional configuration of the cooling cell of this invention with the lid detached.
Figure 2A:
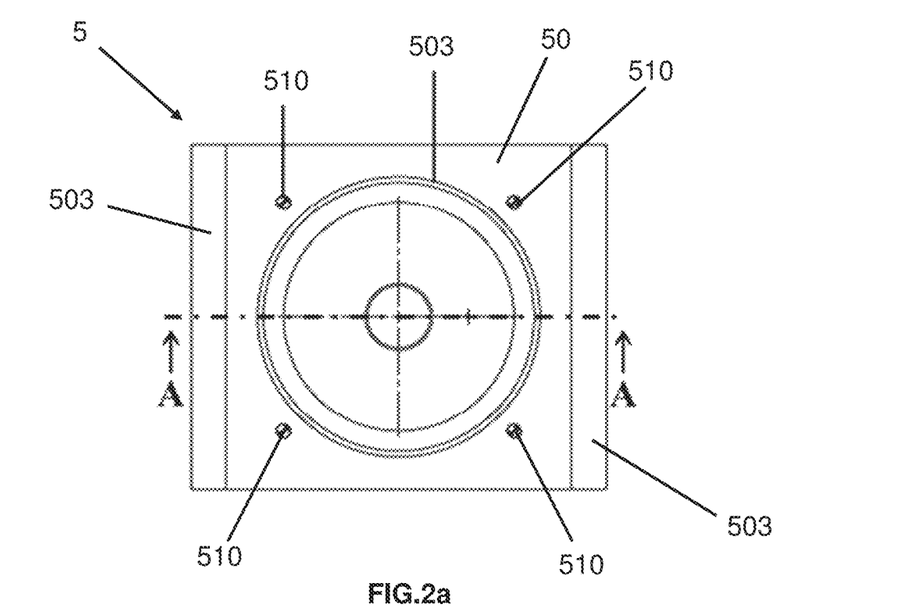
FIG. 2a illustrates a top view of the cooling cell illustrated in FIG. 2, wherein the lid is omitted.
Figure 2B:
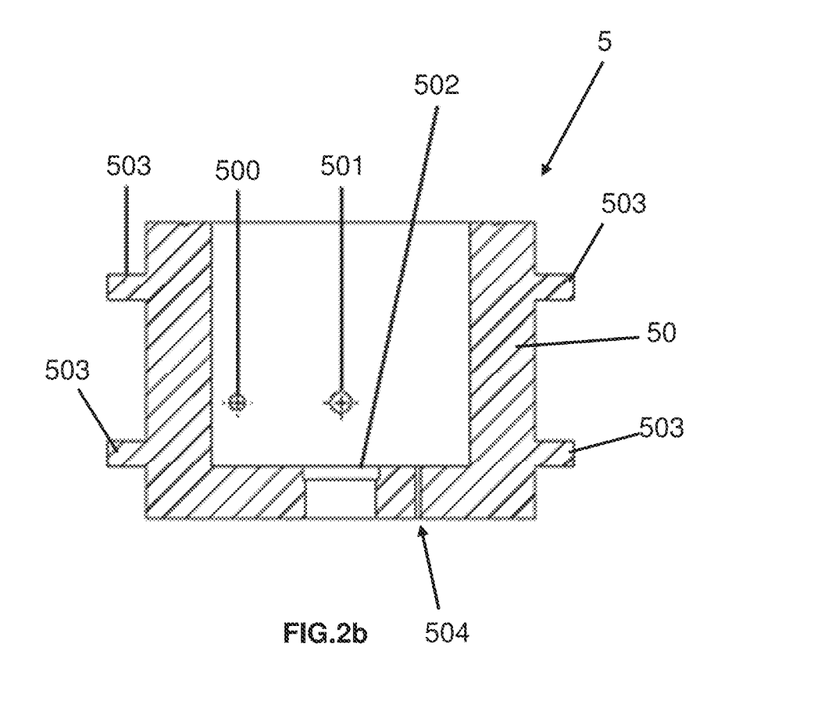

FIG. 2 illustrates a view of an optional configuration of the cooling cell 5 of this invention. FIG. 2a illustrates a top view of the cooling cell 5 illustrated in FIG. 2, and FIG. 2b illustrates the cross-section AA shown in FIG. 2a.

By injecting the refrigerated gas into the cooling cell 5, in particular through the control provided by the data processing unit 4, by the mass flow controller 2, and the proportional integral derivative control 3 (temperature sensor) it is possible to carry out, in a controlled manner, the solidification of the solvent present in the colloidal suspension 92.

It is also important to note that the cooling cell 5, in particular the top lid 51 of the cooling cell, comprises an upper opening 511 which allows the colloidal suspension 92 to be cast into the mold 9, and also allows the de-molding element to subsequently actuate on the manufactured ceramic part 92.

A load is then applied, resulting in the de-molding of the material and its gravity drop in a receiving chamber 6. To this end, the invention also provides that the cooling system of the mold for the manufacturing of ceramic parts manufactured by freeze-casting optionally comprises a receiving chamber 6 positioned lower than the cooling cell 5.

To this end, the cooling cell 5 comprises a lower opening 512 adapted to allow the passage of a manufactured ceramic part 92. Thus, upon completion of the solidification of the part within the mold 9, the manufactured part is slid into the receiving chamber 6 through the lower opening 512 where it will be stored until it is collected.

In addition, the cooling cell 5 comprises a fluid communication opening 504 with the receiving chamber 6 adapted to allow the passage of cooling gas to the receiving chamber 6. Thus, the cooling gas, after being injected into the cooling cell 5, is directed to the receiving chamber 6, which helps to keep the temperature of the newly manufactured part low.

Optionally, the receiving chamber 6 also comprises a temperature sensor for measuring the internal temperature of this chamber.

It is worth mentioning that the low temperature gas obtained in the system also acts on the cooling of the cooling cell 5 itself and the receiving chamber 6, avoiding the fusion of the solvent crystals generated. This process could result in the loss of the ordered pore structure of the prepared materials.

The temperature of the cooling cell 5 can be monitored and adjusted, respectively, by means of a thermocouple 501 (temperature sensor), internal to the cooling cell 5, and the PID controller. Thus, the temperature data of the cooling cell 5 is supplied to the data processing unit 4 and the gas flow is adjusted through the mass flow controller 2. In other words, the data processing unit 4 may be adapted to execute a previously adjusted cooling method adapted to control the flow of gas that can be increased or decreased in response to the information obtained by the system sensors.

Such temperature control of the cooling cell 5 is essential in the preparation of materials with a predefined pore structure given that, as it has been widely disseminated, the cooling rate of the suspension has a direct influence on the morphology and size distribution of the pores obtained.

Figure 3:
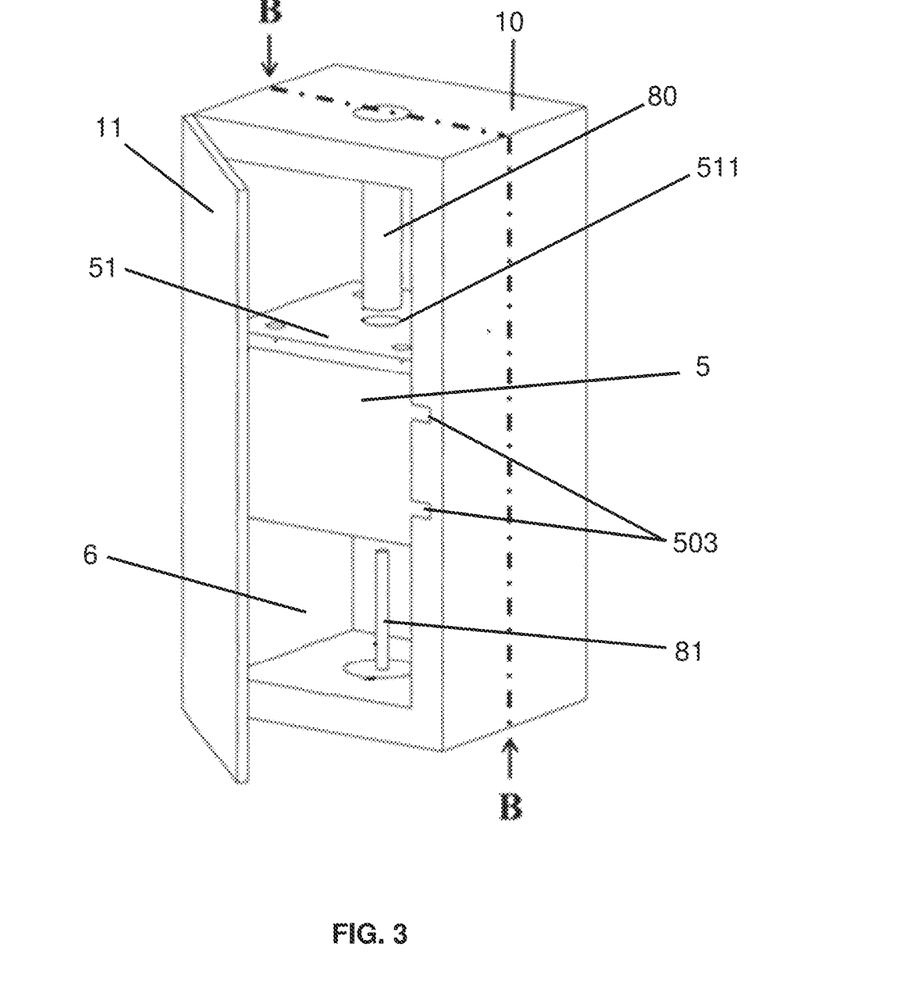
FIG. 3 illustrates a view of a metal casing for accommodating a cooling cell according to an optional configuration of this invention.
Figure 3A:
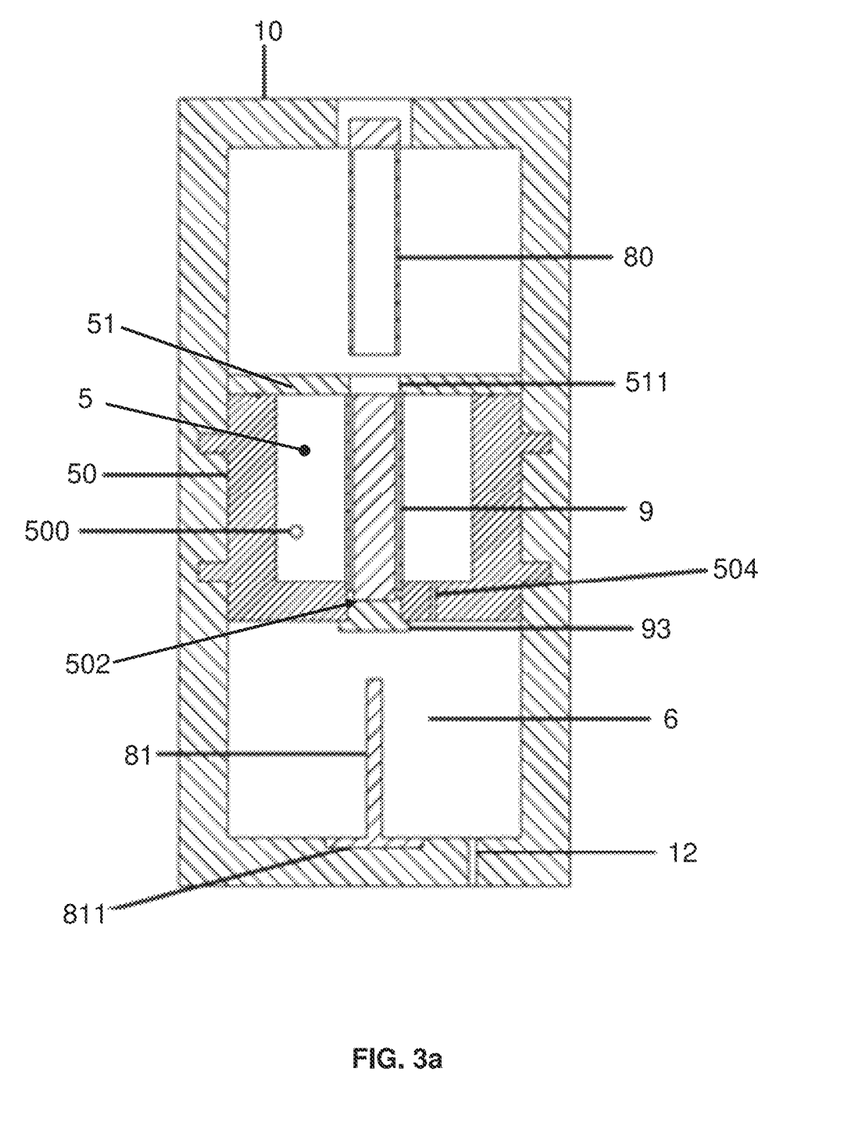
FIG. 3a illustrates a cross-section BB view of FIG. 3.

FIG. 3 illustrates a configuration of a metal casing 10 for accommodating a cooling cell 5 according to an optional configuration of this invention. FIG. 3*a* illustrates a cross-section BB view of FIG. 3. In this configuration, the cooling cell 5 has side wings 503 which allow its attachment to the metal casing 10. Thus, the cooling cell 5 is fixed to the metal casing 10 with a sliding fit. In addition, the metal casing 10 acts as a support for the mechanical-hydraulic component.

Optionally, the cooling cell 5 comprises an upper lid 51, wherein a sealing ring 503 is enacted to seal the fit between the lid 51 and the main body 50 of the cooling cell 5. The sealing ring 503 is important to prevent leakage of the refrigerated gas present in the cooling cell 5.

Optionally, the fixing between the lid 51 and the main body 50 of the cooling cell 5 is carried out with screws (not illustrated). To this end, the holes 510 are provided where the screws used for fixing the upper lid 51 of the cooling cell 5 are positioned.

In its lower part the cooling cell 5 has a lower opening 512, where a sealing element 93 is positioned which may be made of rubber, silicone or any other suitable material. The lower opening 512 also assists in centering the mold 9, as will be detailed below. The main function of the sealing element 93 is to prevent the flow of the colloidal suspension 92 prior to its solidification.

As it has already been described, [on] the cooling cell 5 two holes can be observed that allow the entry of the refrigerated gas 500 and the thermocouple 501. Optionally, the cooling cell 5, including the top lid 51, is made of steel in order to enable it to withstand the constant mechanical and thermal stresses it will be subjected to. It is important to emphasize that in the absence of stainless steel another material with the same function can be used.

Optionally, the metal casing 10 on which the cooling cell 5 is attached is also made of steel in order to enable it to withstand the constant mechanical and thermal stresses it will be subjected to.

Optionally, the metal casing 10 comprises a front door 11 that provides the sealing of the entire metal casing 10. Preferably, the front door is made of glass, which allows to visually monitor the manufacturing process of the desired material.

In addition, in particular in relation to FIGS. 3 and 3*a*, it is possible to observe in detail the de-molding system of ceramic parts manufactured by freeze-casting of the invention. This system comprises a mold 9, wherein the mold 9 comprises an upper opening 95 and a lower opening 94, wherein the upper opening 95 is adapted to receive a colloidal suspension 92, and one of the openings is adapted to allow the passage of a manufactured ceramic part 92. In addition, at least one main de-molding element 80 is provided, adapted to actuate a fabricated ceramic part 92 through an opening in the mold 9.

In the illustrated configuration, the lower opening 94 of the mold 9 matches the lower opening 512 of the cooling cell 5, thus the manufactured part can be expelled into the receiving chamber 6.

Optionally, the mold 9 comprises a cylindrical shape, wherein the manufactured part will comprise a cylindrical outer shape, including solid cylinders or hollow tubes. However, it should be pointed out that various configurations of the mold 9 may be adopted, with the most varied shapes. Thus, the manufactured ceramic part 92 may also comprise other shapes.

Figure 4A:
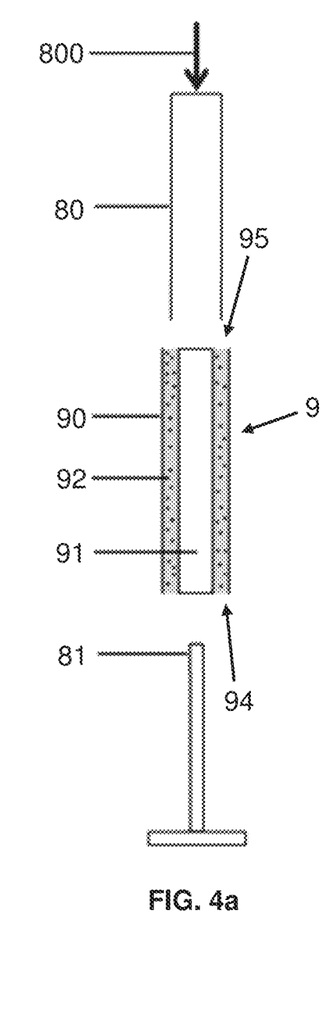
FIGS. 4a and 4b illustrate a sequence of operation of an optional configuration of the de-molding system of ceramic parts of this invention.
Figure 4B:
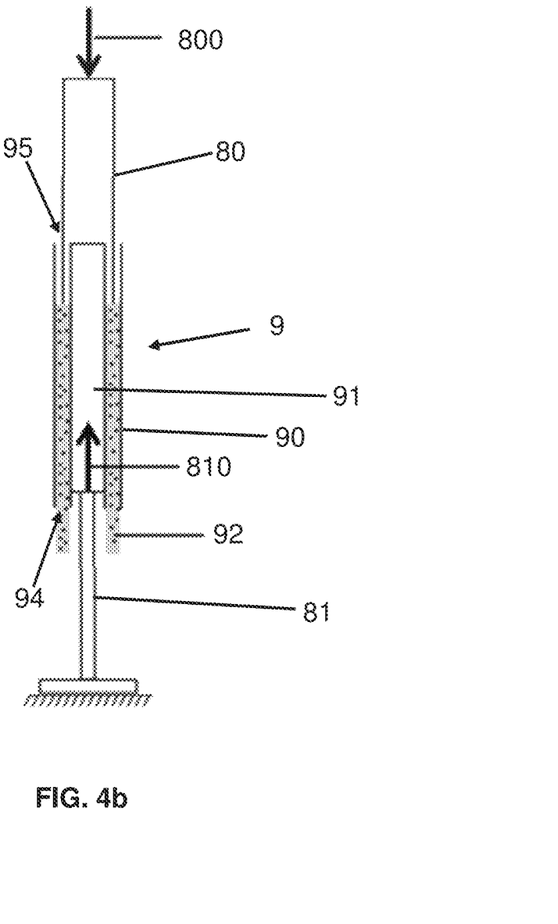

FIGS. 4*a* and 4*b* illustrate a sequence of operation of an optional configuration of the de-molding system of ceramic parts. In this illustrated optional configuration the system further comprises a central mold element 91 and an auxiliary de-molding element 81 adapted to actuate the central mold element 91 counter to the direction of actuation of the main de-molding element 80, wherein the main de-molding element 80 is adapted to slide between the mold 9 and the central mold element 91.

Also optionally, the lower wall of the metal casing 10 comprises a lowering 811 to center and secure the auxiliary de-molding element 81.

Preferably, the main de-molding element 80 is coupled to a mechanical-hydraulic system, which allows for the carrying out of the extraction of the processed material smoothly and without much effort, thus avoiding the formation of defects in the structure of the sample obtained. Even more preferably, especially when the central mold element 91 is adopted, the main de-molding element 80 comprises a tube shape.

The de-molding auxiliary element 81 in turn may comprise a pin shape and is responsible for actuating the central mold element 91, preventing that it is moved by the force 800 exerted by the main de-molding element 80. In other words, while the main de-molding element 80 exerts a downwardly directed force 800 on the central mold element 91/manufactured part 92, the auxiliary de-molding element 81 exerts an opposing force 810 in order to keep the central mold element 91 still. The shearing force generated actuates in the de-molding of the part obtained.

Optionally, the auxiliary de-molding element 81 is secured to the base of the metal casing 10.

It is important to mention that this process of extraction of the prepared material is carried out after the removal of the sealing element 93, given that its presence would make the process difficult. Upon de-molding, the manufactured part 92 falls by gravity into the receiving chamber 6.

Thus, in general, according to the mold cooling method 9 for the manufacturing of ceramic parts by freeze-casting of the invention, refrigerated gas is injected into the cooling cell 5 and then flows into the receiving chamber 6 through the holes provided.

Optionally, the receiving chamber 6 comprises a cooling gas recovery outlet 12. Preferably, the system will also comprise means for transporting the recovered cooling gas into the recovery outlet 12 to the gas source 1. Thus, the cooling gas would be trapped in a closed loop. That configuration would prevent gas waste. In addition, given that the recovered gas may be at a temperature below the ambient temperature, even after going through the entire system, its backfeed may represent energy savings in gas cooling for the next cycle.

Figure 5A:
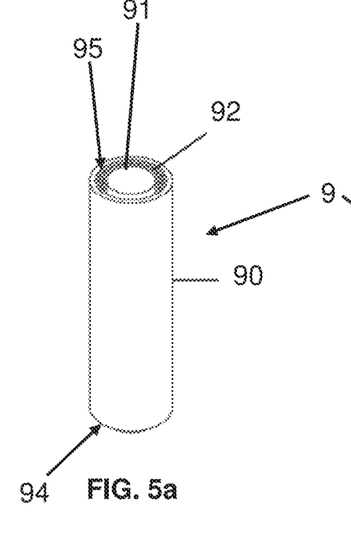
FIG. 5a illustrates an optional configuration of the mold according to this invention.
Figure 5B:
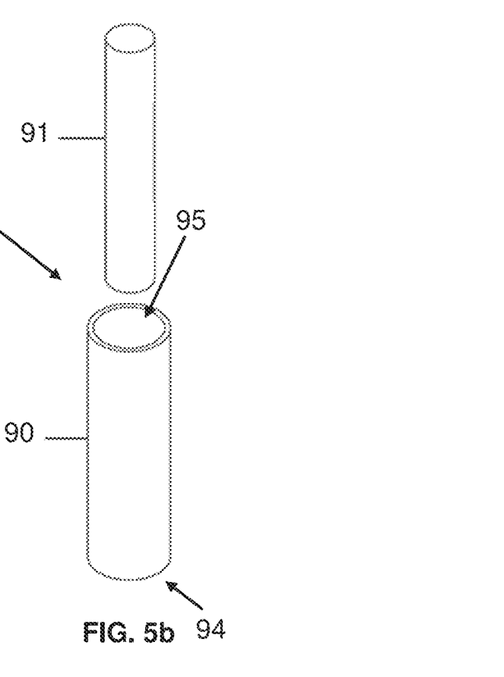
FIG. 5b illustrates the configuration of the mold in FIG. 5a in an exploded view.

FIG. 5a illustrates an optional configuration of the mold 9 according to an optional configuration of the invention. FIG. 5b illustrates the configuration of the mold 9 in FIG. 5a in exploded view. This configuration consists of the use of a central mold element 91 and a main mold element 90. The main mold element 90 is positioned externally and is responsible for the external shape of the part to be manufactured. The central mold element 91 is in turn positioned internally to the main mold element 90 and may be manufactured in a material with a low thermal conductivity.

Preferably, the system is mounted so as to center the central mold element 91 within the main mold element 90. Thus, after the positioning of the mold elements 90/91, a colloidal suspension 92 is cast into the space formed between the two elements. It is highlighted that the entire assembly is positioned inside the cooling cell 5.

Figure 5C:
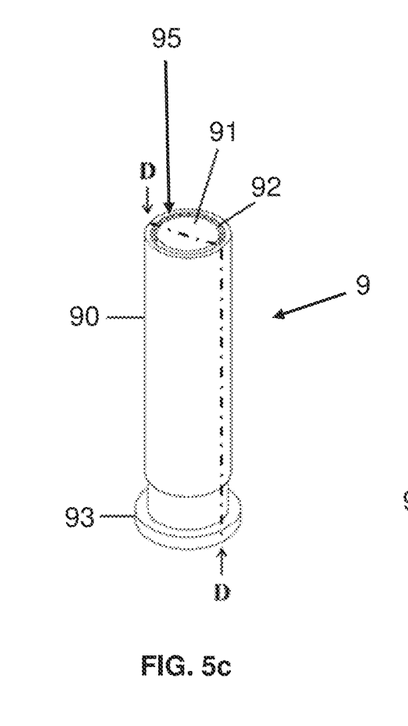
FIG. 5c illustrates a view of the configuration of the mold in FIG. 5a with a sealing element connected.
Figure 5D:
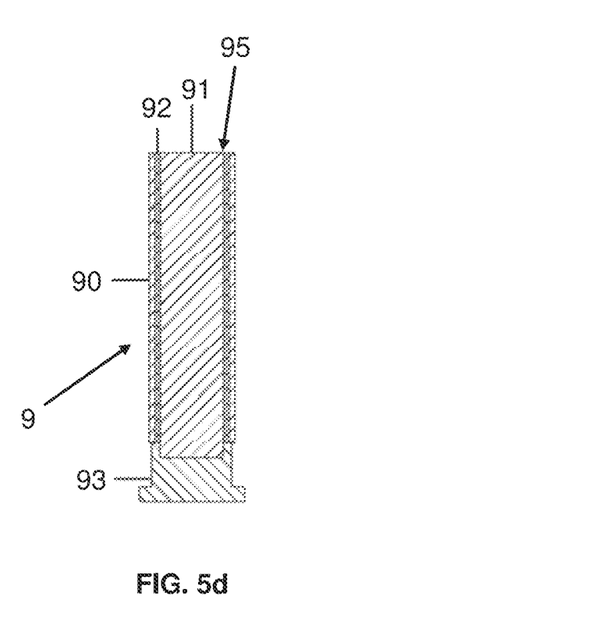
FIG. 5d illustrates the cross-section DD in FIG. 5c.

FIG. 5c illustrates a view of the configuration of the mold 9 in FIG. 5a with a sealing element 93 connected. FIG. 5d illustrates the cross-section DD in FIG. 5c. It can be observed here that the sealing element 93 is adapted to seal the lower portion of the mold 9, especially the space formed between the main mold 90 and the auxiliary elements, preventing the colloidal suspension 92 from leaking before it solidifies.

When the refrigerated gas comes into contact with the main mold element 90, it experiences a rapid loss of heat while the thermal insulation rod is still at a temperature close to the ambient one. This thermal gradient promotes the growth of the solvent crystals in the radial direction from the main mold element 90 to the central mold element 91.

It should be pointed out that by altering the arrangement of the metal components and thermal insulation it is also possible to obtain ceramic parts in the form of pellets or cylinders.

Figure 6A:
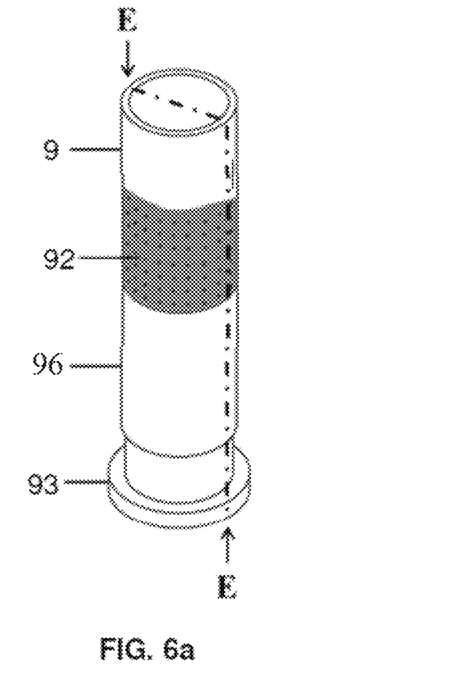
FIG. 6a illustrates a configuration of the mold according to a second optional configuration of this invention.
Figure 6B:
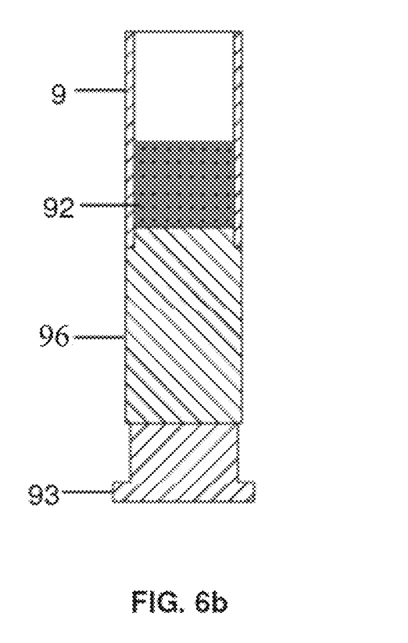

FIG. 6a illustrates a configuration of the mold 9 according to a second optional configuration of this invention. FIG. 6b illustrates the cross-section EE in FIG. 6a. In this configuration, the mold 9 comprises a tubular main mold 90 in a low thermal conductivity material and a lower metal rod 94. The assembly must be configured so as to allow the colloidal suspension 92 to stay on the metal rod and inside the main mold 90. When the refrigerated gas comes into contact with this assembly, the rod undergoes a rapid reduction in temperature while the insulation tube remains at a temperature close to the ambient one. Given that the lower portion of the suspension is at a temperature well below the one observed in the upper portion, the solvent crystals formed during freezing are stimulated to grow in the vertical orientation, from the lower to the upper surface.

Therefore, it is clear that this invention solves the problems of the state of the art that is proposed, in particular by providing the system for de-molding ceramic parts manufactured by freeze-casting, which allows a smooth de-molding of the manufactured parts, in addition to providing the mold cooling system and method for manufacturing ceramic parts by freeze-casting.

Numerous variations to the scope of protection of the present patent application are permitted. Thus, it is emphasized that this invention is not limited to the particular configurations/embodiments described above.

The invention claimed is:

1. A mold cooling system for manufacturing ceramic parts by freeze-casting, the mold cooling system comprising:
    a cooling gas source;
    a cooling gas cooling medium fluidically connected to the cooling gas source; and
    a cooling cell fluidly connected to the cooling gas cooling medium, wherein the cooling cell comprises:
        a main body comprising a lower opening;
        a mold within the main body and including a first space; and
        a refrigerated cooling gas injection opening that communicates with a second space inside the main body, the second space being outside of the mold;
    wherein the mold comprises:
        an upper opening configured to allow passage of a colloidal solution into the first space of the mold; and
        a lower opening configured to allow passage of a ceramic part, fabricated in the first space, from the first space to an outside of the mold, and
    wherein the lower opening of the main body is aligned with the lower opening of the mold such that the lower opening of the main body is configured to allow passage of the ceramic part from the mold to below the main body.

2. The mold cooling system according to claim 1, wherein the cooling gas cooling medium comprises a heat exchanger immersed in a cooling fluid, wherein the heat exchanger is a coil.

3. The mold cooling system according to claim 1, further comprising: a data processor and at least one from among the following:
    a mass flow controller configured to control at least one from among the following: a volume of a cooling gas from the cooling gas source; and a volume of the cooling gas injected into the cooling cell; and
    at least one temperature sensor device, wherein at least one temperature sensing device is a proportional integral derivative controller,
    wherein the data processor is in communication with at least one from among the mass flow controller, the at least one temperature sensing device, and the proportional integral derivative controller.

4. The mold cooling system according to claim 1, further comprising a receiving chamber below the cooling cell,
    wherein the main body comprises a fluid communication opening communicatively connected to the receiving chamber, and configured to allow passage of cooling gas from the second space of the main body to the receiving chamber.

5. The mold cooling system according to claim 3, wherein the cooling gas is a gas with a moisture content lower than 20%.

6. The mold cooling system according to claim 4, further comprising:
   stainless steel pipes communicating with the cooling gas source, the cooling gas cooling medium, the cooling cell, and the receiving chamber.

7. A mold cooling system for manufacturing ceramic parts by freeze-casting, the mold cooling system comprising:
   a cooling gas source;
   a cooling gas cooling medium fluidically connected to the cooling gas source;
   a cooling cell fluidly connected to the cooling gas cooling medium and comprising a mold and a refrigerated cooling gas injection opening; and
   a metal casing surrounding the cooling cell, wherein the cooling cell comprises side wings,
   wherein the cooling cell is fixed in the metal casing through a sliding fit, and
   wherein the metal casing acts as a support for a de-molding system for ceramic parts manufactured by freeze-casting.

8. A mold cooling system for manufacturing ceramic parts by freeze-casting, the mold cooling system comprising:
   a cooling gas source;
   a cooling gas cooling medium fluidically connected to the cooling gas source; and
   a cooling cell fluidly connected to the cooling gas cooling medium and comprising a mold and a refrigerated cooling gas injection opening,
   wherein the cooling cell further comprises an upper lid and a main body, wherein a sealing ring is between the upper lid and the main body of the cooling cell, and
   wherein the upper lid and the main body of the cooling cell are fixed together.

9. The mold cooling system according to claim 1, further comprising a sealing element configured to seal the lower opening of the mold.

10. The mold cooling system according to claim 1, further comprising a metal casing comprising a glass door.

11. The mold cooling system according to claim 4, wherein the receiving chamber comprising a recovery outlet configured to receive a cooling gas from the cooling gas source.

* * * * *